United States Patent [19]
Ramsteck

[11] 3,926,811
[45] Dec. 16, 1975

[54] FILTER-PLATE ASSEMBLY FOR FILTER PRESS

[75] Inventor: Wolfgang Ramsteck, Staig-Weinstetten, Germany

[73] Assignee: Lenser Verwaltungs-GmbH, Senden, Germany

[22] Filed: Oct. 2, 1974

[21] Appl. No.: 511,184

[30] Foreign Application Priority Data
Nov. 24, 1973 Germany............................ 2358578

[52] U.S. Cl.................................. 210/231; 210/227
[51] Int. Cl.²........................................ B01D 25/12
[58] Field of Search........................... 210/227–231, 210/445

[56] References Cited
UNITED STATES PATENTS

| 1,308,943 | 7/1919 | French............................. 210/227 X |
| 3,221,883 | 12/1965 | Lennstrom....................... 210/231 X |
| 3,289,845 | 12/1966 | Weber.................................. 210/231 |
| 3,347,383 | 10/1967 | Augerot........................... 210/231 X |
| 3,543,938 | 12/1970 | Busse.................................. 210/231 |
| 3,655,056 | 4/1972 | Schotten et al..................... 210/227 |
| 3,737,041 | 6/1973 | Kitajima............................. 210/228 |

FOREIGN PATENTS OR APPLICATIONS
| 1,363,465 | 5/1963 | France............................... 210/231 |
| 1,039,493 | 9/1958 | Germany........................... 210/231 |

*Primary Examiner*—Theodore A. Granger
*Attorney, Agent, or Firm*—Karl F. Ross; Herbert Dubno

[57] ABSTRACT

A pair of geometrically identical filter plates lying one against the other are each formed with a rigid central panel and a rigid frame surrounding the panel. A flexible web interconnects the outer edge of the rigid panel and the inner edge of the frame so as to allow this panel to be displaced by fluid pressure between the panels so as to press a filter cake. The faces of the panel towards the filter chambers are corrugated and the web region interconnecting the polygonal panel to the frame is formed with rigid bars in the straight sections along the sides of the panel. At the rounded corners of the panel this web section is relatively thin for maximum flexibility.

10 Claims, 7 Drawing Figures

FILTER-PLATE ASSEMBLY FOR FILTER PRESS

FIELD OF THE INVENTION

The present invention relates to a filter-plate assembly for a filter press. More particularly this invention concerns such an assembly wherein the individual filter plates are adapted to be overlain by a filter medium and can be displaced toward this medium for removal of the filter cake thereon.

BACKGROUND OF THE INVENTION

A filter press is known having a plurality of plate assemblies each constituted by two plates each in turn forming one side of a filter chamber. A fabric filter medium is stretched over each of the plates and inlets and outlets are provided to allow passage of the liquid to be filtered through each of these filter media. To this end each of the plates is formed at least on its surface toward the filter medium with corrugations so that a filtrate can be collected between the plate and its filter medium.

In such an apparatus once a filter cake of predetermined thickness is formed on the filter medium the plates are pushed outwardly against the respective filter medium during a washing operation so as to loosen this filter cake and allow it to be removed. In fact two opposite plates can together press the filter cake very tightly so as to squeeze virtually all of the liquid out of it and allow it to be removed as a relatively dry solid.

In order that the plate be movable it is frequently carried on an inflatable bladder which need merely be blown up in order to displace this plate outwardly into the filter chamber. It is also known to provide a flat bladder which itself constitutes the two opposite walls of an inflatable chamber. Both of these arrangements are relatively complicated either in the mounting of the rigid wall on the bladder or of the bladder within the filter press. Thus the cost of such filter presses is relatively elevated and their service life is limited.

OBJECTS OF THE INVENTION

It is therefore an object of the present invention to provide an improved plate assembly for a filter press.

Another object is the provision of an improved plate for such a press which is relatively inexpensive and yet has a long service life.

SUMMARY OF THE INVENTION

These objects are attained according to the present invention in a filter-plate assembly for a filter press which comprises a pair of generally rigid and parallel planar plates each of which is surrounded by a respective frame. A flexible web interconnects each of the frames with its respective plate so as to form between the two plates a substantially closed chamber which can be pressurized so as to displace the plates away from each other. Such an arrangement in accordance with this invention is made entirely of synthetic-resin material by deep-drawing or a similar procedure. Thus the plates are relatively inexpensive yet extremely durable.

In accordance with yet another feature of this invention the central panel of each of the walls is generally polygonal with rounded corners. The web is thus subdivided into a plurality of straight sections each lying along a respective side of the central panel, and a plurality of short curved sections as corners of the panel. The straight sections are each formed in an intermediate region as a relatively rigid and inflexible bar extending parallel to the respective side of the polygonal central panel and attached along one longitudinal edge via a thin web portion to the respective side of the panel and along the opposite longitudinal edge by means of another thin web portion to the corresponding side of the frame. The curved corner sections of the web are relatively thin and flexible. Thus on displacement of the two central panels away from each other the bars of the straight sections effectively rotate about their own axes.

In accordance with still another feature of this invention the outer face of the panel and the outer faces of the bars of each of the straight sections are corrugated so that filtrate drawn through the filter cake and filter medium overlying each of the plates can be collected.

According to yet another feature of this invention that thin web portion which connects each of the bars to the respective central panel is closer to the other plate than that web portion which connects the bars is to the frame so that when displaced outwardly these two web portions are compressed. Such avoidance of stretching these web portions greatly increases the service life of the assembly.

According to yet another feature of this invention, there is provided in each of the plate assemblies a rigid reinforcing plate which lies between the two filter plates and against which the central sections of the filter plates normally lie. Thus should there be a considerable pressure differential across the assembly, that is between two adjacent filter chambers, deformation of the plates is prevented.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
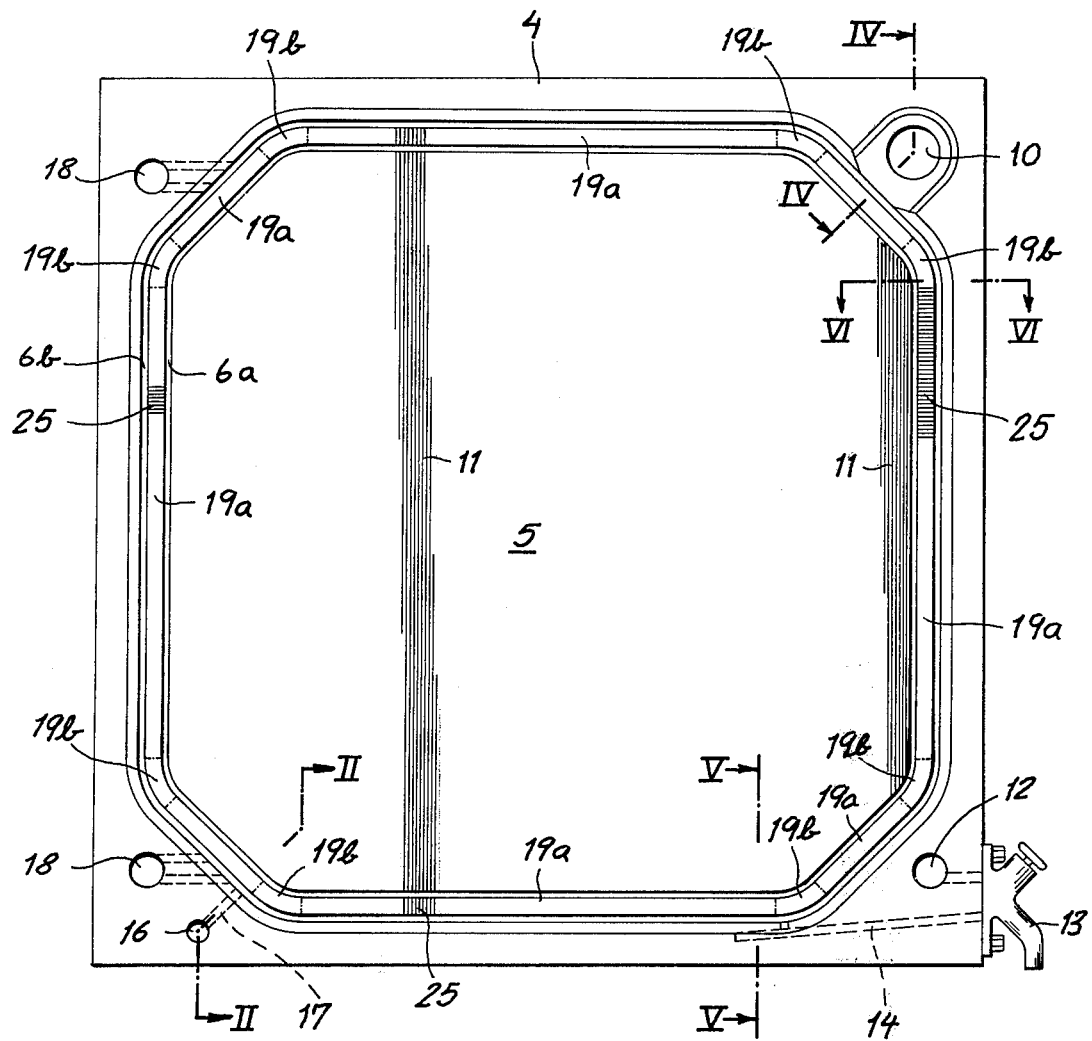
FIG. 1 is a front elevational view of a plate assembly according to the present invention.

As shown in FIGS. 1–6 a filter-plate assembly for a filter press is symmetrical about a plane 1 and comprises a pair of spectrally identical plates 2 and 3 each formed by a respective frame 4, a respective polygonal panel 5, and flexible webs 6a and 6b. The frame 4, panel 5, and webs 6a and 6b are all integrally formed of synthetic-resin material, here a polyamide such as nylon being used. Webs 6a and 6b form the bases of outwardly open respective grooves 7 and 8 and inwardly open respective grooves 7a and 8a.

Figure 5:
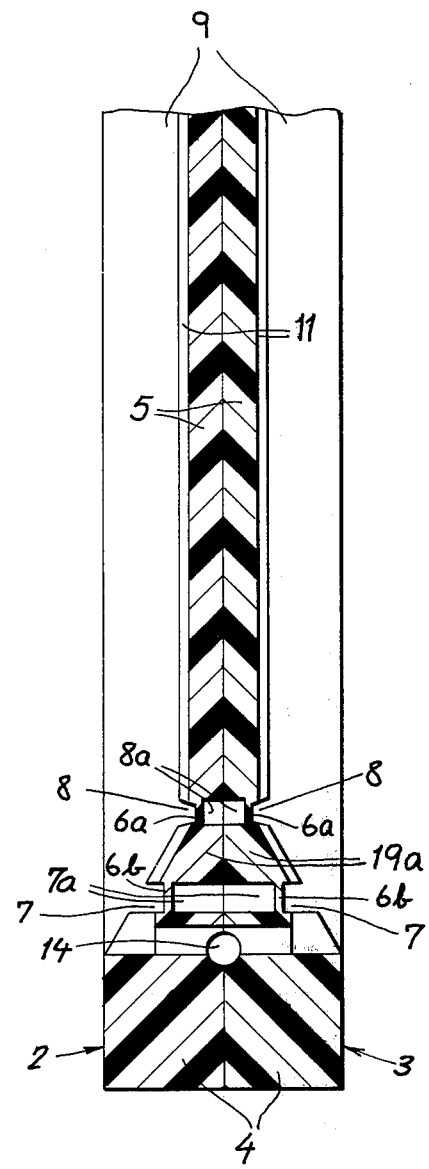

Each of the plates 2 and 3 forms one side of the respective filter chamber 9 into which a liquid to be filtered is introduced through an inlet opening 10 (FIG. 4) which is formed in the plates 2 and 3 at the frame 4. A textile filter medium is secured over the corrugated face 11 of the plates 2 and 3 and filtrate can be drawn off through an outlet passage 12 which is formed in the frame 4 (FIGS. 1 and 5). The outlet 12 is connected via a valve 13 and a passage 14 for filtrate collection underneath the filter medium.

Figure 2:
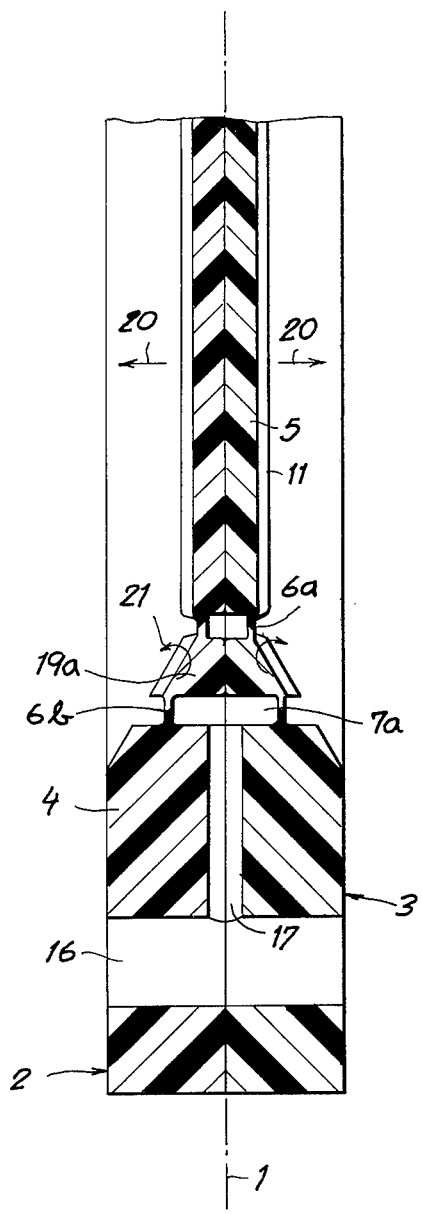
FIG. 2 is a section taken along line II—II of FIG. 1.
Figure 3:
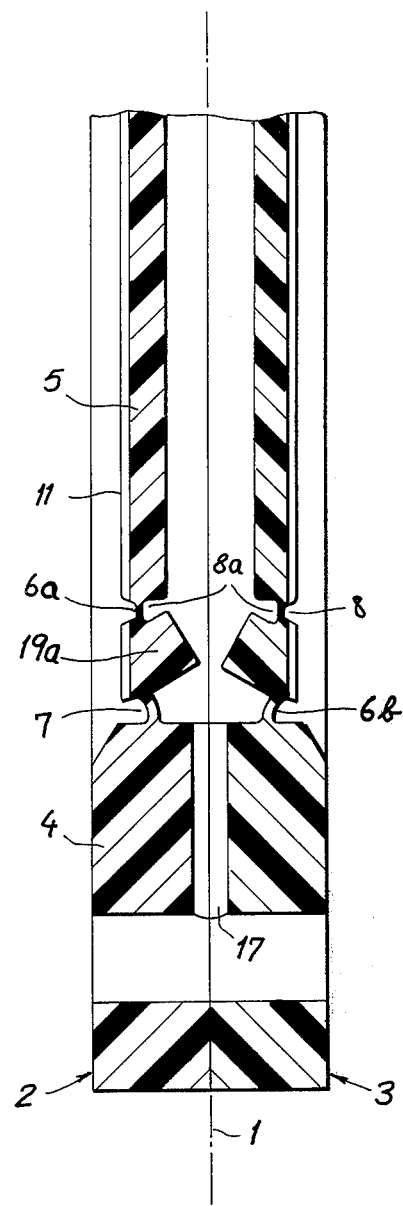
FIG. 3 is a section similar to FIG. 2 showing the plates in another position.
Figure 4:
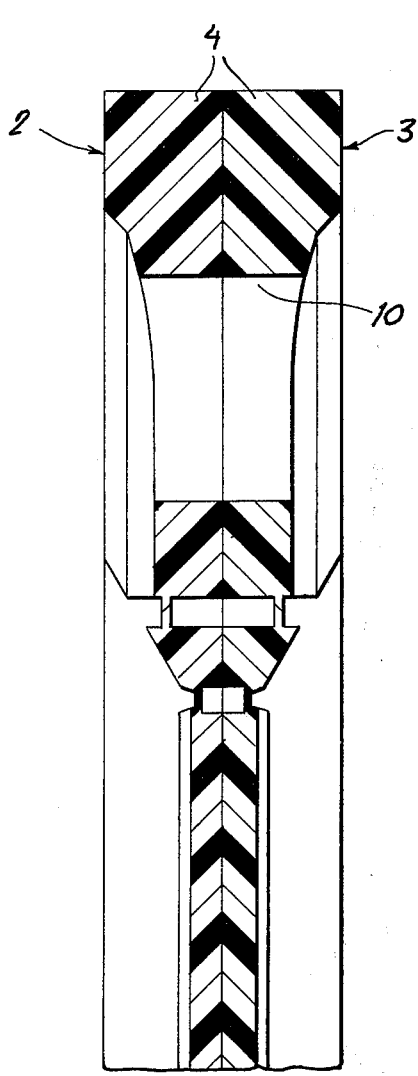
FIGS. 4, 5 and 6 are sections taken along lines IV—IV, V—V, and VI—VI, respectively, of FIG. 1.

The frame 4 is also formed with a passage 16 (FIGS. 2 and 3) into which a pressurizable fluid can be admitted so as to pass via a branch passage 17 between the two plates 2 and 3 and displace them from the position shown in FIG. 2 into the position shown in FIG. 3 in order to press out the filter cake formed on the medium in the filter chambers 9.

In addition wash water inlets 18 are provided (FIG. 5) which serve for washing off the filter plates between pressing operations.

Between the webs 6a and 6b there are straight sections 19a lying along the straight side of the polygonal panel 5 and curved sections 19b around the rounded corners thereof. Each of these straight sections 19a is constituted by a rigid bar which as shown in FIGS. 2 and 3 is rotated about its own axis (arrow 21) on pressurization of the chamber between the panels 5. The web 6a which joins these bars 19a to the panel 5 is inward of the web 6b joining these bars 19a to the frame 4. Thus the webs 6a and 6b in the region of the bars 19a are only stressed by compression; they are never stretched so that their service life is very long. The bars 19a are formed with corrugations 25 which are transverse to the longitudinal axis of these bars and allow filtrate to be collected.

Figure 6:
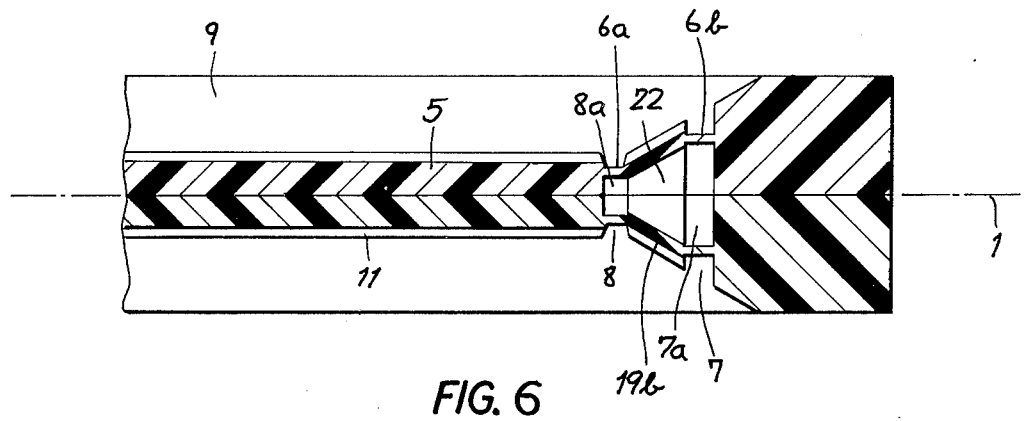

The web sections 19b are similarly ribbed and have outer surfaces forming a continuous band with the outer surfaces of the bars 19a. However, these sections 19b are not rigid, but, as shown in FIG. 6, are relatively thin so that they can deform when the panels 5 are stretched apart in the direction of arrows 20 by pressurization of the chamber between them.

Figure 7:
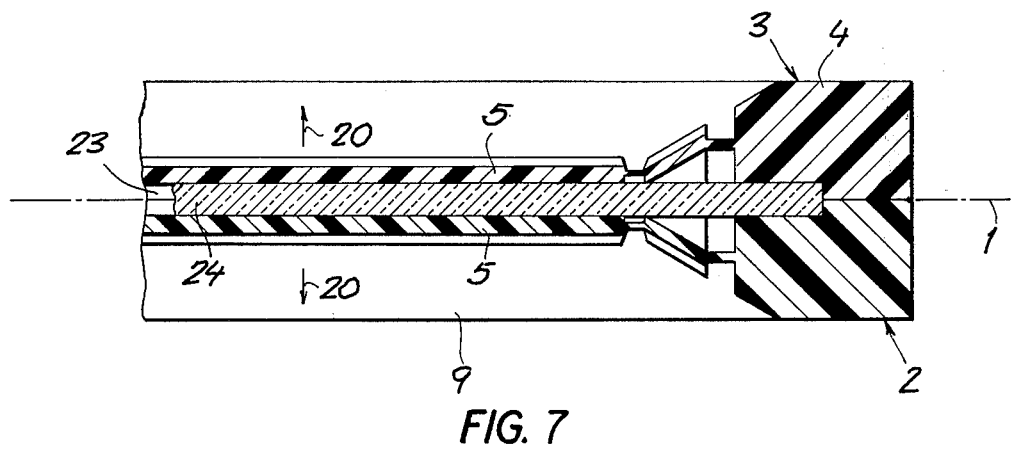
FIG. 7 is a view similar to FIG. 6 illustrating an alternative arrangement in accordance with the present invention.

Although the panels 5 are rigid, it is occasionally necessary to provide reinforcement between them so as to prevent a pressure differential between the two adjacent chambers 9 from deforming these panels 5 and possibly damaging the filter medium. To this end as shown in FIG. 7 it is possible to provide a plate 24 of glass or hard synthetic resin such as polymethylmethacrylate in the chamber 23 between the two panels 5. This reinforcing plate 24 has its outer edge received in a groove in the frame 4 so that it rigidly defines the rest position of the panel 5.

I claim:
1. A filter-plate assembly for a filter press comprising a pair of like parallel plates each unitarily formed with:
   a generally rigid and planar central panel having an outer peripheral edge, the panels of said pair each having opposite faces turned toward respective filter chambers and adjacent faces in face-to-face relationship;
   rigid frames each substantially coplanar with and surrounding the respective peripheral edge of each panel, said frames being in sealing relationship with one another;
   fluid inlet means within said frames and in fluid communication with a space adapted to be formed between said faces in face-to-face relationship whereby fluid introduced into said space through said fluid inlet means can displace said rigid panels oppositely toward the respective filter chambers; and
   flexible web structures sealingly connected to peripheral edges of each of said generally rigid and planar central panels and to inner peripheral edges of the respective rigid frame surrounding each panel, said flexible web structures being constructed and arranged to flexibly yield upon introduction of a fluid into said space to define between said plates a substantially closed actuation chamber.

2. Thee assembly defined in claim 1 wherein each of said plates is formed at the respective web with at least one endless groove extending around the respective panel.

3. the assembly defined in claim 2 wherein each of said plates is formed on its said one face with corrugations.

4. The assembly defined in claim 3 wherein each central panel is generally polygonal and each web has a plurality of straight sections lying along the sides of the respective panel and a plurality of curved corner sections joining the ends of said straight sections and extending around the corners of the respective panel.

5. The assembly defined in claim 4 wherein said web structures each comprise an inner endless relatively thin web portion connected to said panel, an outer endless relatively thin web portion connected to said frame, and an intermediate endless web portion between said inner and outer portions.

6. the assembly defined in claim 5 wherein said intermediate web portion has a corrugated face adapted to be turned toward said filter chamber and formed as a continuous even band.

7. The assembly defined in claim 5 wherein said intermediate web portion is substantially thicker in said straight sections than in said curved sections and is formed in each of said straight sections as a bar parallel to the respective side of the respective panel.

8. The assembly defined in claim 5 wherein each inner web portion is spaced closer to the respective other face than the respective outer web portion.

9. The assembly defined in claim 1 wherein said plates are made entirely of synthetic-resin material.

10. The assembly defined in claim 1, further comprising a further reinforcing plate of substantially greater rigidity than said panels lying between said plates at said actuation chamber.

* * * * *